Jan. 15, 1952   C. M. YOUNG   2,582,305
AIRPLANE MANEUVERING SYSTEM
Filed July 17, 1948
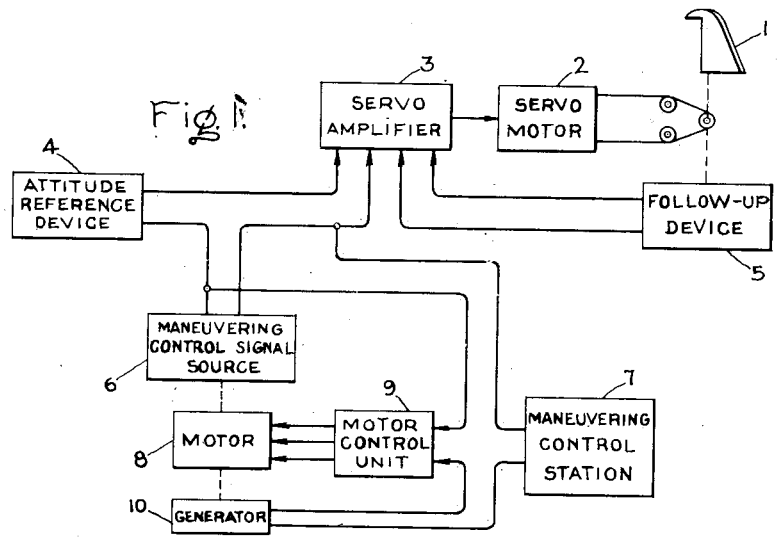
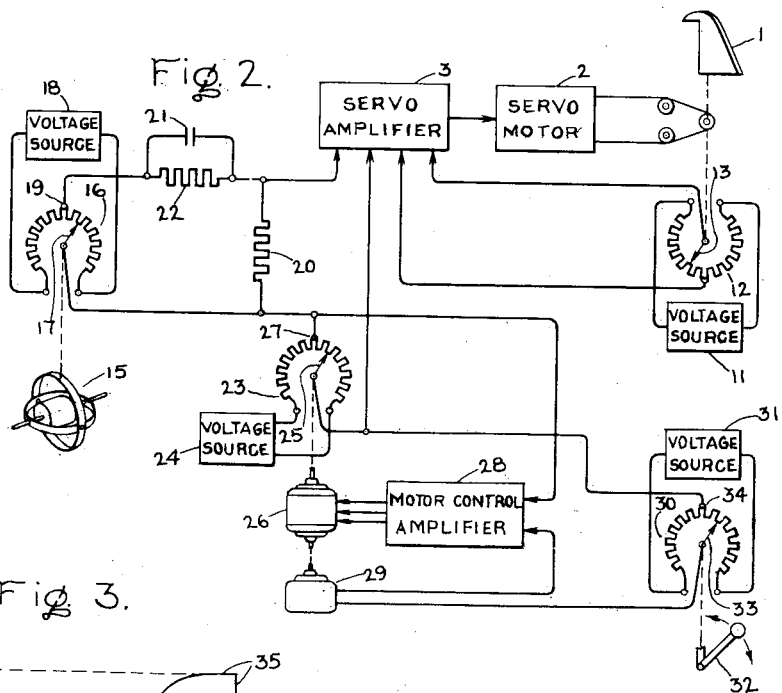
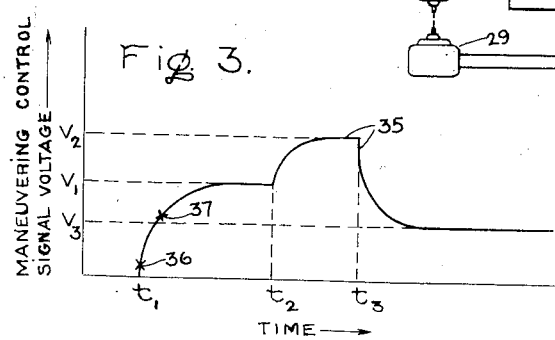
Inventor:
Charles M. Young,
by Claude N. Mott
His Attorney.

Patented Jan. 15, 1952

2,582,305

UNITED STATES PATENT OFFICE 2,582,305

AIRPLANE MANEUVERING SYSTEM

Charles M. Young, Schenectady, N. Y., assignor to General Electric Company, a corporation of New York Application July 17, 1948, Serial No. 39,346

6 Claims. (Cl. 318—489)

The present invention relates to automatic control systems and, more particularly, to arrangements for automatically piloting and maneuvering craft.

Conventional automatic pilots utilized on aircraft, for example, function to stabilize the craft about three control axes, namely, the vertical or yaw axis, the longitudinal or roll axis, and the lateral or pitch axis. As is well known, such stabilized control of flight is accomplished by actuating the ailerons, elevators and rudder of the aircraft in response to motions of the craft about the axes with which these control surfaces are associated, and the control surfaces are actuated in directions to correct for undesired motions and to maintain predetermined flight conditions. Movements of control surfaces during automatic piloting intervals are produced by servomotor equipment which may respond to the error signals derived from such apparatus as gyroscopic instruments, pendulums, compasses, or other altitude-responsive devices.

Maneuvering by means of an autopilot control system is advantageous in that the sensitive autopilot equipment need not be disengaged from autopilot operation to permit such maneuvering and then be synchronized with flight attitudes prior to re-engagement. Since it is desirable that simple maneuvers be performed without desensitizing the autopilot and thereby avoid the foregoing disadvantage, many arrangements have been proposed whereby manipulations of a miniature control stick or other control member produce outputs of control signals which are introduced into autopilot system to cause actuation of the aircraft control surfaces by the servomotors and hence the accomplishment of the maneuvers prescribed by motions of the control stick. Present maneuvering controls of this nature may be objectionable in that the position of the autopilot control member to produce a desired maneuver is not necessarily that which would obtain from a full-sized control stick directly actuating the aircraft control surfaces, and the pilot thus cannot instinctively be certain of what the response of the craft will prove to be. Additionally, aircraft servo equipment is capable of rapidly exerting tremendous forces on the control surfaces in response to the electrical signals derived from movements of the miniature control stick and violent maneuvering often obtains when the stick is moved to achieve a sizable change in craft attitude.

In accordance with the present invention, a maneuvering or trim signal is delivered to the autopilot system by a maneuvering system where- in the maneuvering trim signal output changes at an initial rate proportional to the control stick deflection and then approaches zero rate in substantially exponential fashion until the desired maximum level of trim signal output obtains. This form of signal precludes violent maneuvering of the craft when the attitude thereof is altered by control stick motion. The preferred embodiments of this invention eliminate very large capacitors to achieve the exponential changes in trim signal values and hence make the system practical for use in autopiloting of aircraft. It will also be shown that the maneuvering autopilot control stick movements to achieve changes in craft attitudes will be similar to those movements which would be required of a full-sized control stick connected directly to the control surfaces to produce the attitude changes, hence the "feel" of the system appears more natural to the human pilot.

One object of this invention, therefore, is to provide a new and improved type of maneuvering autopilot which accomplishes changes in aircraft attitudes within safety and comfort limits.

Another object of this invention is to provide a maneuvering autopilot wherein the maneuvering control signals are modified to prevent violent aircraft maneuvers and wherein such modification is accomplished by simple and practical apparatus.

Further, it is an object to provide a maneuvering autopilot wherein the position of the maneuvering control stick represents the final aircraft attitude.

Additionally, it is an object to provide a maneuvering autopilot wherein the maneuvering control signal to accomplish a predetermined maneuver approaches the desired magnitude at a rate proportional to the difference between the instantaneous magnitude of the signal and the said desired magnitude determined by the position of a maneuvering control member.

Other objects and advantages of the present invention will become apparent from the description of the drawings, in which:

Figure 1 represents in block form a single-channel maneuvering autopilot system in accordance with this invention;

Figure 2 depicts, partially in block and partially in schematic form, a more detailed embodiment of one channel of the maneuvering autopilot of the invention whereby the foregoing objects are satisfied; and Figure 3 illustrates the waveforms of the envelopes of signals introduced into the servo system of the subject autopilot.

Automatic piloting systems are conventionally comprised of several electrical, mechanical, or fluid-pressure channels by means of which it is possib.e to control separate functions by equipment in these substantially independent channels. Thus, it is possible, for example, to control such functions as motions of the craft with respect to the yaw axis, roll axis, pitch axis, a radio guide path, or altitude, and, the apparatus for producing corrective movements of the craft in response to signals indicating erroneous movements thereof may often be represented as a single channel. For purposes of clarity, the drawings of present application are not those of a complete multiple-function autopilot but instead show only a single maneuvering autopilot channel, it being apparent to those skilled in the art that the same principles will apply to the control in other channels if desired.

In Figure 1 the control is represented with respect to an aircraft yaw axis and the control surface 1, shown accordingly as a rudder, may be actuated by a conventional servo motor 2 responsive to signals from a servo amplifier 3. Control signals are delivered to the servo amplifier from three sources: the attitude reference device 4, the follow-up device 5, and the maneuvering control signal source 6. The attitude reference device 4 may be a gyroscopic instrument with associated equipment for producing an output of error signals variable in phase and magnitude in accordance with the sense and extent of the craft movements about the yaw axis, or in accordance with the sense and rate of movements about the yaw axis. Follow-up device 5 serves to provide repeat-back signals for the servo amplifier responsive to movements or some other condition, such as pressure, of the control surface 1 and thereby reduces the tendency of the craft to hunt or oscillate about the desired path of flight.

In addition, it is known to introduce to the input of the servo amplifier another control signal which actuates the servo system and control surface to accomplish maneuvering of the craft. Such a maneuvering control signal may, for example, be one variable in phase and magnitude with changes in the direction and extent of motion of a manually-movable maneuvering control member from a neutral position. The disadvantages hereinbefore mentioned in connection with this type of maneuvering arrangement are not incurred by the system shown in Figure 1, however. Maneuvering control station 7 in the present invention produces a control signal output having the above characteristics, but this output is not directly fed to the servo amplifier. Instead, the output of the maneuvering control signal source 6 is applied to the amplifier 3, and the signal output of source 6 is caused to approach that of the maneuvering control station 7 at a rate proportional to the instantaneous difference between the output signals of station 7 and source 6. The means for accomplishing the production of the desired form of signal output from source 7 includes motor 8, the motor control unit 9 and generator means 10 in addition to source 6 itself and the maneuvering control station 7.

Maneuvering control signal source 6 is illustrated with a mechanical connection to a movable element of motor 8 which similarly and simultaneously drives the generator 10. The motor control unit 9 delivers an output of signals to motor 8 which is actuated to produce mechanical movements having a direction and rate responsive to the sense and magnitude of the signals from unit 9. The input to motor control unit 9, which may take the form of a signal mixer or amplifier, is the series combination of the signal outputs from generator 10, maneuvering control station 7, and maneuvering control signal source 6.

In operation of the maneuvering autopilot, if the control surface 1 is to be deflected to maneuver in a desired direction, the control station would be manually adjusted to produce an output signal of the appropriate phase and magnitude. Assuming that no signal from source 6 or generator 10 exists prior to this adjustment, due to a stable on-course condition of flight, the control station signal alone would be applied at full magnitude to the motor control unit 9. Responsive to the sense and magnitude of the output of unit 7, the motor 8 would begin to move in a direction to cause the signal output from source 6 to equal that of station 7 and at a rate proportional to the magnitude of the output from source 7. However, motion of the motor also actuates generator 10 which may, for example, produce an output proportional to the rate of the motor mechanical output movement and having a polarity or phase dependent upon the direction of such movement, and this generator output is connected in opposition to the control station output such that the input to the motor control unit is thereby reduced. The rate at which motor 8 moves is changed not only by the operation of generator 10 but also by the signal output of the maneuvering control signal source 6 which is fed back to the input to the motor control unit 9 degeneratively with respect to the signal from control station 7. Thus, the rate at which the signal output from source 6 increases or decreases varies as a function of the instantaneous difference between the outputs of source 6 and control station 7 and as a function of the rate at which motor 8 moves at any instant.

Figure 2 depicts a more detailed embodiment of the autopilot arrangement which may accomplish maneuvering with reference to the aircraft yaw axis. It will become apparent that maneuvering with respect to other axes may be similarly accomplished. Control surface 1, servomotor 2, and servo amplifier 3 have for convenience been designated with the same numerals employed in the system of Figure 1. Follow-up or autopilot repeat-back signals are produced by the combination of a voltage source 11 and a potentiometer 12 connected thereacross, the wiper arm 13 being coupled to the control surface 1 for rotation therewith and the output of follow-up signals being derived from between wiper arm 13 and the tap point 14 on the potentiometer. The attitude reference device of Figure 2 is comprised of the directional gyro instrument 15, potentiometer 16 whose wiper arm 17 is coupled for rotation with the second gimbal of gyro 15, voltage source 18 connected across potentiometer 16, and the reference signal modifying network connected between the potentiometer wiper arm 17 and the potentiometer tap point 19. This modifying network includes the resistance 20 and the parallel combination of capacitance 21 and resistance 22 in series therewith. The output voltage delivered to servo amplifier 3 from across resistance 20 includes the error signal voltage from potentiometer 16 and a derivative thereof which compensates for certain of the lags present in an autopilot system, and this modifying network illustrates that certain components of the autopilot arrangement may be modified in accordance with known practices and yet remain within the scope of the present maneuvering invention. The source of maneuvering control signals comprises a potentiometer 23 connected across voltage source 24, with potentiometer wiper arm 25 being rotated by motor 26 and the output being derived from between the wiper arm 25 and the tap point 27. This maneuvering control signal is applied serially with the attitude reference signal from resistance 20 to the servo amplifier 3 and is also applied to the input of the motor control amplifier 28 together with the output of the generator 29 and the signal from the maneuvering control station. Both the servo amplifier 3 and the motor control amplifier 28 may be of the types conventionally employed in servo systems whereby the outputs thereof may each drive a servomotor in either of two directions depending upon the polarity or phase of the signals applied to the amplifier.

The maneuvering control station equipment for the rudder control is represented by the potentiometer 30, voltage source 31 connected thereacross, miniature control stick 32, and potentiometer wiper arm 33 mechanically coupled for actuation by the control stick 32. An output of control station signals of amplitude proportional to the magnitude of displacement of the control stick from a neutral position and having a phase dependent upon the direction of such displacement is secured between wiper arm 33 and the potentiometer tap point 34. It should be apparent that the voltage sources of Figure 2 might be a single source common to all of the potentiometers and that the supply may be of direct or alternating current. Additionally, while it has been convenient to represent the sources of the signals having the desired phase and amplitude characteristics as potentiometer devices, other devices, with which those skilled in the art are well acquainted, of an inductive nature for example, may be substituted therefor and Selsyn-type instruments are presently preferred in practice. The type of generator described has been primarily for the purpose of illustration and it should be recognized that the means for generating a control signal characteristic of the movements of the motor may comprise Selsyn, potentiometer or other signal generating means and that the advantages of this invention will be retained.

The operation of the maneuvering autopilot channel which Figure 2 illustrates may be more clearly understood with reference to Figure 3 wherein a representative output of the maneuvering control signal source for certain maneuvers is plotted with respect to time. The plot 35 may represent D. C. voltage output between wiper arm 25 and tap point 27 or the envelope of the A. C. voltage between these same terminals or corresponding terminals of an inductive pick-off device. If it is assumed that immediately preceeding time $t_1$ the aircraft is stably on-course and that the rudder 1 is to be deflected from its neutral position, then with negligible consumption of time and at substantially the time $t_1$ the miniature control stick 32 would be moved to the position which corresponds to that to which a full-sized control stick would be moved to produce the desired extent of rudder deflection. As a result of this new position of maneuvering stick 32, the voltage appearing between wiper arm 33 and tap 34 of potentiometer 30 would be the voltage $V_1$ at substantially instant $t_1$ and this voltage would immediately be applied to motor control amplifier 28 and motor 26. With the application of the large voltage to motor 26 from amplifier 28, either voltage $V_1$, or a voltage proportional thereto, motor 26 begins to turn rapidly in a direction determined by the polarity of the output of amplifier 28 and drives potentiometer wiper arm 25 from coincidence with tap point 27 at the same high rate. The maneuvering control output voltage appearing between wiper arm 25 and tap point 27 thus increases with the rate indicated by the slope at point 36 in the graph of Figure 3. As the maneuvering control output voltage increases its degenerative influence on motor control amplifier 28 increases since this output voltage is applied to amplifier 28 in series opposition to the signal from the maneuvering control station potentiometer 30. Consequently, the voltage applied to motor 26 decreases both as a result of the degenerative effect of generator 29 and of the maneuvering control output voltage. The motor speed therefore decreases and the rate of increase of the maneuvering control signal output voltage at a slightly later time, indicated by point 37 on the graph, for example, also decreases. At time $t_2$ the maneuvering voltage between potentiometer arm 25 and tap point 27 is essentially equal to voltage $V_1$, this maneuvering voltage cancels that from the control station potentiometer 30, motor 26 has stopped, generator 29 delivers no output, and the full maneuvering control signal is introduced into the servo amplifier 3 to accomplish the desired maneuver.

Figure 3 also shows the maneuvering control signal voltage changes between times $t_2$ and $t_3$ when the miniature control stick is again moved in the same direction to a still greater extent to produce the final level of maneuvering voltage $V_2$, and the changes in maneuvering voltage after time $t_3$ represent those produced by positioning of the miniature control stick at a point back towards a neutral position to establish a lower maneuvering voltage level $V_3$ to which the control surface 1 is to respond. While for purposes of this discussion it has been assumed that the generator produces an output whose magnitude increases substantially linearly with speed of the motor and that the motor speed is substantially directly proportional to the resultant voltage appearing at the input to the motor control unit, it may of course be found convenient to permit or establish other proportions between the named conditions.

Violent aircraft maneuvering is effectively precluded by this invention since the maneuvering control signals applied to the servo system do not suddenly increase or decrease to the desired level in accordance with rapid positioning of the maneuvering control stick. Instead, the maneuvering control signal approaches the level of the signal output from the control station in the manner described hereinbefore, the initial rate of increase or decrease of the maneuvering control stick being dependent upon the magnitude of the difference between the control station signal set in by control stick motion and the maneuvering control signal existing at the time the control station signal is changed. If for any particular application the time required for the motion of the aircraft to a new attitude is too great, the pilot may overcontrol and then return the miniature control stick to the desired attitude.

Additionally, the generator output characteristic with respect to speed may be selected or adjusted to secure the optimum maneuvering rate for certain autopilot requirements; or, the motor control unit or the motor itself may be adapted to prevent excessive or insufficient rates of changes of the maneuvering control signals. The complete multiple-function maneuvering autopilot may, of course, include components in addition to or different from those it has been preferred to illustrate herein, and, by way of example: the system may be D. C. or A. C.; Selsyn-type instruments might be employed in place of potentiometers; the attitude reference device might be of the direct displacement or rate of attitude change type; the follow-up device might respond to control surface forces instead of displacement; and means may be provided to compensate for lags in the autopilot system or to eliminate trim effects.

It should be apparent, therefore, that there are numerous changes which could be made in the above-described constructions by those skilled in the art without departing either in spirit or scope from the present invention. Hence, it is intended that all matter contained in the foregoing description or shown in the accompanying drawings shall be interpreted as illustrative and not in a limiting sense.

What I claim as new and desire to secure by Letters Patent of the United States is:

1. In a manually operable maneuvering control system for a craft including a movable attitude control surface, actuating means for moving said surface to an extent and in a sense responsive to the magnitude and phase of control signals applied thereto, a motor device for producing movements of a movable motor element to an extent and in a direction determined by the magnitude and phase of signals applied to said device, means movable with said motor element for producing an output of maneuvering control signals having a phase and magnitude representative of the orientation of said motor element with respect to a predetermined position, a manual control station for producing control signals having a magnitude and phase responsive to the extent and direction in which a manually operable control element is moved from a predetermined position, generator means controlled by said motor element for producing control signals having a magnitude and phase responsive to the rate and direction of movement of said motor element, means for applying to said motor device the combination of said control station signals said maneuvering control signals and said generator control signals, said maneuvering and generator control signals each being combined degeneratively with respect to said control station signals, and means for supplying said maneuvering control signals to control said actuating means.

2. In a manually operable maneuvering control system for a craft including a movable attitude control surface, actuating means for moving said surface to an extent and in a direction responsive to the magnitude and phase of input signals supplied thereto, a motor, means coupled with said motor for producing an output of maneuvering control signals having a phase and magnitude representative of the instantaneous orientation of a movable element of said motor with respect to a predetermined position, signal generating means controlled by said motor, a manual control station for producing control signals having a magnitude and phase representative of the orientation of a control element thereof with respect to a predetermined position, means for combining said maneuvering control signals and said signals from said generating means with said control station signals and degeneratively with respect thereto, means for actuating said motor at a speed and in a direction determined by the resultant magnitude and phase of the combined control signals, and means supplying said maneuvering control signals to control said actuating means.

3. In a manually operable maneuvering control system for a craft comprising at least one control surface, a servo motor for actuating said control surface, a second motor, means coupled with said second motor for producing maneuvering control signals having characteristics representative of the instantaneous orientation of said second motor, a generator controlled by said second motor, a manual control station for producing control signals having characteristics representative of the position of a control element thereof, means for combining said maneuvering control signals and said generator signals with said control station signals and degeneratively with respect thereto, means responsive to said combined signals for actuating said second motor, and coupling means utilizing said maneuvering control signals to control said servomotor.

4. A maneuvering autopilot system for a craft comprising control surface means for controlling movements of said craft about a control axis thereof, a servomotor connected to actuate said control surface means, pick-off means responsive to movements of said craft about said control axis for producing control signals variable in magnitude and polarity in accordance with the magnitude and direction of undesired movements of said craft, follow-up means responsive to the magnitude and sense of a condition associated with said control surface means for producing follow-up control signals variable in magnitude and polarity, a control station for producing control signals variable in magnitude and polarity responsive to the extent and direction of movement of a control member from a predetermined position, a motor device, a maneuvering signal source coupled with said motor for producing an output of maneuvering control signals having a magnitude and polarity responsive to the extent and direction of displacement of a movable element of said motor from a predetermined position, generating means controlled by said movable motor element for producing control signals variable in magnitude and polarity responsive to the rate and direction of motion of said movable motor element, means for applying said control signals from said generating means, said control station, and said maneuvering signal source to actuate said motor device, and means for applying said control signals from said maneuvering signal source, said pick-off means, and said follow-up means to actuate said servomotor.

5. A maneuvering autopilot system according to claim 4 wherein said means for applying control signals to said motor device includes connections for serially and degeneratively adding said control signals from said generating means and said maneuvering signal source to said control signals from said control station, and wherein said means for applying control signals to said servomotor includes connections for serially and degeneratively adding said follow-up control signals to the algebraic sum of said pick-off and maneuvering control signals.

6. A maneuvering autopilot system for a craft comprising a control surface for controlling movements of said craft, a servomotor for actuating said control surface, means for producing pick-off control signals responsive to undesired movements of said craft, follow-up means for producing follow-up control signals responsive to a condition associated with said control surface, a motor, a maneuvering signal source actuated by said motor for producing maneuvering control signals, a generator actuated by said motor for producing control signals, a manually-actuated control station for producing control signals, means for controlling said motor by said control signals from said control station, said generator, and said maneuvering signal source, and means for actuating said servomotor by said control signals from said maneuvering signal source, said pick-off signal means, and said follow-up signal means.

CHARLES M. YOUNG.

REFERENCES CITED

The following references are of record in the file of this patent:

UNITED STATES PATENTS

| Number | Name | Date |
|---|---|---|
| 2,105,598 | Hubbard | Jan. 18, 1938 |
| 2,115,086 | Riggs | Apr. 26, 1938 |
| 2,423,337 | Moseley | July 1, 1947 |
| 2,429,642 | Newton | Oct. 28, 1947 |

FOREIGN PATENTS

| Number | Country | Date |
|---|---|---|
| 449,886 | Germany | Sept. 8, 1927 |